United States Patent
Hano

[11] 3,729,125
[45] Apr. 24, 1973

[54] TACK-WELDING METHOD AND INSTALLATION

[75] Inventor: Masaaki Hano, Yokohama, Japan

[73] Assignee: Nippon Kokan Kabushiki Kaisha, Tokyo, Japan

[22] Filed: Aug. 25, 1970

[21] Appl. No.: 66,844

[30] Foreign Application Priority Data

Sept. 6, 1969  Japan..............................44/70466

[52] U.S. Cl. ......................228/26, 29/471.1, 219/56, 228/25, 228/47
[51] Int. Cl. ..............................................B23k 29/00
[58] Field of Search......................228/25, 26, 27, 47; 29/429, 471.1; 219/56

[56] References Cited

UNITED STATES PATENTS

| | | | |
|---|---|---|---|
| 1,694,555 | 12/1928 | Naugle et al. | 228/26 X |
| 1,878,136 | 9/1932 | Hasse et al. | 228/27 |
| 2,158,664 | 5/1969 | Lytle et al. | 228/27 X |
| 2,533,605 | 12/1950 | Mueller | 228/26 X |
| 3,530,571 | 9/1970 | Perry | 29/33 P |
| 3,543,392 | 12/1970 | Perry et al. | 29/564 X |
| 3,619,552 | 11/1971 | Cape | 228/27 X |

Primary Examiner—J. Spencer Overholser
Assistant Examiner—Richard Bernard Lazarus
Attorney—Steinberg & Blake

[57] ABSTRACT

A tack-welding method and installation according to which work which is tack-welded by one tack-welding unit will be supplied to a plurality of welding machines. The work is fed in a given direction at a given speed which is too great for any one welding machine, and the tack-welding unit is reciprocated back and forth along a path parallel to that along which the work moves. At least while the tack-welding unit is moving in the same direction as the work, it is maintained at a speed sufficiently different from the work speed to provide between the work and the tack-welding unit a relative speed suitable for tack-welding, and only during this movement of the tack-welding in the same direction as the work are the tack-welding operations carried out. A distributing structure receives the work from the tack-welding unit and distributes the work to the plurality of welding machines.

7 Claims, 6 Drawing Figures

Patented April 24, 1973

INVENTOR
MASAAKI HANO
BY Stevens & Blake
ATTORNEYS

TACK-WELDING METHOD AND INSTALLATION

BACKGROUND OF THE INVENTION

The present invention relates to welding.

In particular, the present invention relates to methods and installations which are used for initially tack-welding the work and then further welding the work.

In welding operations it is often necessary to initially provide tack-welding of members before further welding thereof takes place. For example, where such members are in the form of plates which are to be assembled in welded condition so as to form beams of any desired angular cross-section such as T-beams, I-beams, etc., or in the case where pipes are butt-welded one to the next, as well as in many other situations, the members are initially tack-welded, before the welding operations are carried out. Such tack-welding has conventionally been carried out manually in almost all cases. This requirement of manual tack-welding operations has resulted in expenditure of a large number of man-hours which could be saved if the manual operations were not required. The losses are particularly great in the case of mass-production systems where along the lines of flow of the work toward the welding machines, it is essential to situate operators for manual tack-welding operations prior to the time when the work reaches the welding machines. The welding machines can generally handle the work at a rate far greater than it is possible to carry out the manual welding operations, so that the flow of the work along the flow lines of the mass-production system is necssarily interrupted while a worker accumulates along a flow line extending toward one welding machine an amount of work sufficiently great to warrant operation of the machine. Thus, such a machine will be operated only intermittently, resulting also in a considerable loss.

While there are automatic tack-welding processes, it is required at best that the number of tack-welding units be equal to the number of welding machines which receive the tack-welded work from the units since it is considered essential that the welding machines be capable of welding the tack-welded work at a rate sufficiently great to handle all of the work which comes from the tack-welding units. The result is that a tack-welding unit is synchronized with a tack-welding machine which receives work only from this one unit and which welds the work at the same rate that the work is tack-welded by the tack-welding unit. Therefore, the number of tack-welding units is required to equal the number of welding machines since all of the units and machines handle the work at the same rate. Thus, wherever automatic tack-welding has been used instead of manual tack-welding, enormous expenditures for equipment has been required with the result that such installations have not proved to be widely used. Welding machines are of general utility whereas tack-welding units are special structures which must be built in a special way and which have only a limited range of utility, thus resulting in an extremely high cost for each tack-welding unit.

SUMMARY OF THE INVENTION

It is accordingly a primary object of the present invention to provide a method and installation which will avoid the above drawbacks.

Thus, it is an object of the invention to provide a welding method and installation wherein automatic tack-welding can be carried out by a suitable tack-welding unit while at the same time not only eliminating the costs involved in manual tack-welding operations but also greatly reducing the costs involved in expenditure for equipment.

In particular, it is an object of the invention to provide a method and installation which enable one tack-welding unit to supply work to a plurality of welding machines which are maintained operating continuously with the work which is supplied by the one tack-welding unit.

With the method and installation of the invention, the work is moved along a path adjacent a tack-welding unit at a speed which is much higher than the normal speed of movement of work during conventional tack-welding operations, and a tack-welding unit is simultaneously moved parallel to the work first in the same direction as the work and then in an opposite direction. When the unit is moved in the same direction as the work, there is maintained between the tack-welding unit and the work a speed differential equal to the speed normally encountered during conventional tack-welding operations so that a suitable tack-welding operation can be carried out while both the work and the tack-welding unit are moving in the same direction but at different speeds. The work which is tack-welded is then distributed by a distributing means to a plurality of welding machines which can be maintained in continuous operation with the tack-welded work received from the one tack-welding unit.

In this way it becomes possible to achieve a fully automatic tack-welding operation and at the same time not only are labor costs reduced but also equipment costs are reduced.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
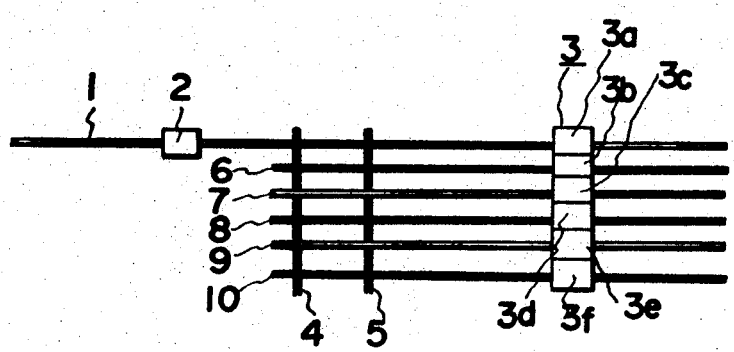
FIG. 1 is a schematic plan view of a welding method and installation of the invention.

FIG. 1 illustrates the layout of a welding installation for providing a high output of welded work which initially is tack-welded. The work is initially conveyed along the path 1 so as to reach a tack-welding unit 2 where tack-welding operations are carried out according to the present invention in the manner described in greater detail hereinbelow. The tack-welding unit 2 is aligned with a welding machine 3a of a row 3 of welding machines, this row including the welding machines 3b-3f all arranged in succession one beside the other along the straight row 3. A distributing means is provided for distributing the work received from the tack-welding unit 2 to the plurality of tack-welding machines 3a-3f. The speed with which the work is moved during the tack-welding operations is so high that the work is delivered from the tack-welding unit 2 at a rate far too great to be handled by any one of the plurality of machines 3a-3f. In fact, the speed is so high that it is possible to deliver from the tack-welding unit 2 tack-welded work at a rate sufficiently great to maintain all of the machines 3a-3f operating continuously. In this way, a continuously increasing backlog of work at any one of the welding machines is avoided and at the same time fully automatic operations are maintained with a higly economical use of equipment and low expenditure for initial equipment while at the same time keeping labor costs at a minimum.

The distributing means which extends transversely with respect to the row 3 between the latter and the tack-welding unit 2 may take many different forms. In the illustrated example, the work may be fed along rails which carry rollers along which the work can roll, and these rails and rollers are arranged along the several paths 6-10 for respectively directing the work toward the machines 3b-3f. While the work rests on the rollers, it is advanced therealong by overhead pushing units in the form of endless chains which carry fingers capable of projecting downwardly to engage the work and advance the work along the several paths 1 and 6-10 illustrated in FIG. 1. As is apparent from FIG.1, there are a pair of transverse components 4 and 5. These take the form of endless chains, for example, driven in synchronism with each other and carrying portions of each track, or in other words, a section of each rail or track with rollers thereon. Thus, the one or more sections of the roller tracks extending along the paths of flow of the work to the several welding machines will at any given instant be alinged with one or more of the several tracks while capable of being intermittently advanced from one path to another. The operation of the components 4 and 5 is synchronized with the operation of the overhead work-pushing structures so that after one tack-welded article moves to the right beyond the component 5, the next article will be received from the unit 2 and delivered to the flow path 6, the next to the flow path 7, etc. Thus, the components 4 and 5 form cross-feed lines for distributing the work received from the unit to the several lines 6-10, so that in this way it becomes possible to distribute the work from the one unit 2 among the plurality of machines 3a-3f, while maintaining all of the machines in continuous operation.

It thus becomes possible with the invention to achieve automatic tack-welding at a high speed while reducing the number of individual tack-welding units which are required, so that instead of having one tack-welding unit for each welding machine, one tack-welding unit can supply a relatively large number of welding machines.

Figure 2:
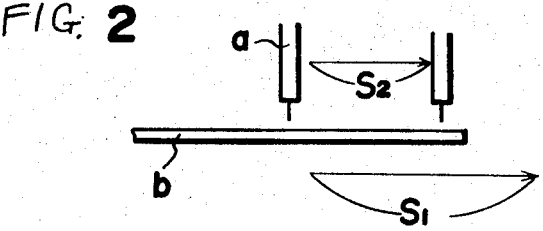
FIG. 2 is a schematic representation of the tack-welding principles of the invention.

The principles of the tack-welding method of the invention are illustrated in FIG.2. The work b is schematically represented in FIG.2 moving to the right at a speed $S_1$. The tack-welding unit a is schematically represented in FIG.2 in the form of a welding nozzle also moving to the right from the starting location A to the end location B at a speed $S_2$ which in the illustrated example is smaller than the speed $S_1$. The actual tack-welding operations are carried out during the period when the unit a moves in the same direction as the work b. At this time the relative speed between the work and the tack-welding unit will be equal to the difference between the speeds $S_1$ and $S_2$. Thus, it is only this speed differential which need be maintained at a value which is suitable for achieving a satisfactory tack weld. As a result, it becomes possible to transport the work b at a speed far greater than has heretofore been possible in connection with conventional tack-welding methods, while at the same time the actual tack-welding operations are carried out at tack-welding speeds which are perfectly suitable for high quality tack welds and which in fact correspond to normal tack-welding speeds.

In one installation according to the invention operated according to one specific example of a method of the invention, the work b is transported at a speed of 6,000 mm/min., while the nozzle of the welding unit a is moved at a speed of 5,400 mm/min. Thus, in this case, the actual tack-welding speed is only 600 mm/min., with the work actually moving at 10 times this latter speed. In general, it has been determined that tack-welding speeds may advantageously be maintained at less than 1,000 mm/min., so that with the method and installation of the invention, a tack-welding speed, in other words the differential speed between the work and the tack-welding unit, can be maintained at a range of 600 mm/min. to 1,000 mm/min.

When the tack-welding unit a, reciprocated back and forth between the starting location A and the end location B, by any one of a number of different means as described below, begins to move in the same direction as the work b, which is to say when the nozzle of the tack-welding unit begins to move from the location A toward the location B, the electrical circuit to the tack-welding unit is completed to bring about a welding arc which discharges at the nozzle of the tack-welding unit so as to tack weld the work b. The circuit is automatically opened as soon as the tack-welding unit moves in the reverse direction from the end location B to the starting location A. For this purpose it is possible to locate in the circuit suitable limit switches responding to movement of the tack-welding unit, or the nozzle thereof, so as to bring about the required opening and closing of the welding circuit which will enable the tack-welding operations to be carried out only at least during part of the time when the tack-welding unit and the work move in the same direction. Thus, each time the nozzle or unit a begins to move from location A to location B at the speed $S_2$, the welding circuit is completed and a discharge welding arc is achieved for tack-welding the work b, and successive tack-welds can be provided in this way on each assembly of members which constitute an article which is to be tack-welded. These operations are successively repeated on each article and on the successive articles which constitute the work. Of course, no tack-welding operations take place during movement of the tack-welding unit in the reverse direction from the location B to the starting location A. Instead of using limit switches it is possible also to supply suitable timers.

While in the above example specific mention was made of the situation where the work is moved at a speed greater than the tack-welding unit, it is of course to be understood that it is also possible to achieve satisfactory tack-welding operations by moving the tack-welding unit or nozzle at a speed greater than the speed of movement of the work. It is only important that the relative speed or the differential speed between the tack-welding unit and the work be suitable for achieving a satisfactory tack weld.

Figure 3:
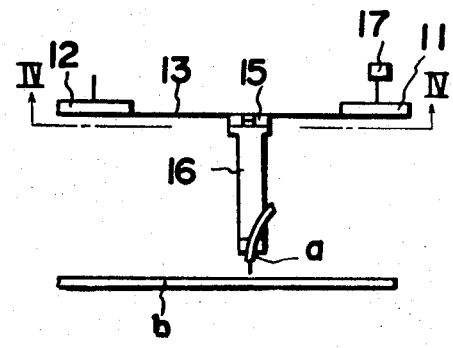
FIG. 3 is a schematic side elevation of a tack-welding unit and structure for reciprocating the same.
Figure 4:
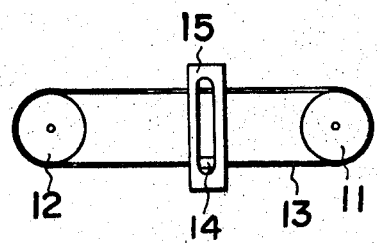
FIG. 4 is a schematic plan view of the structure of FIG. 3 taken along line IV—IV of FIG.3 in the direction of the arrows.

FIGS. 3 and 4 schematically represent one possible embodiment of a structure for reciprocating a tack-welding unit. In the example illustrated there is an endless chain 13 guided around a pair of horizontal sprockets 11 and 12 which have parallel vertical turning axes. The endless chain 13 carries a projecting block or pin 14 which serves to transmit the movement from the chain to the welding unit. For this purpose, the nozzle holder 16 of the tack-welding unit, which includes the nozzle a carried by the holder 16, is fixed at its upper end to a plate or body 15 formed with a transverse slot in which the pin or block 14 can move back and forth transversely to the plane of FIG. 3. The body 15 is supported on a pair of unillustrated rails having, for example, tongues extending longitudinally of the rails and received in grooves of the body 15. These rails support the body 15 and extend parallel to the runs of the chain 13 which extend between the wheels 11 and 12, in the manner shown in FIG. 4. Thus, the rails which support the body 15 extend parallel to the direction of movement of the work and thus the nozzle holder 16 of the tack-welding unit can only move in a direction parallel to the path of the work. The transverse slot in the body 15 is sufficiently long so that the motion transmitting block or pin 14 upon reaching the pulley 11 will move along the slot from one end region to the other end region thereof, and of course, the element 14 will move in the reverse direction when reaching the pulley 12. Thus, it becomes possible to reciprocate the tack-welding unit back and forth with a structure as shown in FIGS. 3 and 4 and described above. The pulley or sprocket wheel 11 can be driven by a suitable motor 17. Instead of the above-described arrangement it is also possible for the element 14 to engage part of the plate 15 which is formed with suitable slits or spaces through which the element 14 can move when reaching the sprocket wheel 11 to go around the latter and again engage a portion of the plate 15 to return the components, after which the same operations are repeated in the other direction. Thus plate 15 can be formed with suitable slits or the like through which element 14 can move away from and back to the plate 15 while going around the sprockets 11 and 12.

Figure 5:
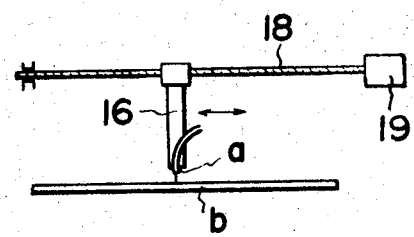
FIG. 5 is a schematic side elevation of another embodiment of a tack-welding unit and structure for reciprocating the same.

With the system which is represented in FIG. 5 the nozzle holder 16 of the tack-welding unit is reciprocated back and forth by means of a rotary screw 18 extending through a threaded bore at the upper end region of the holder 16 and rotated first in one direction and then in an opposite direction by a suitable drive 19.

Figure 6:
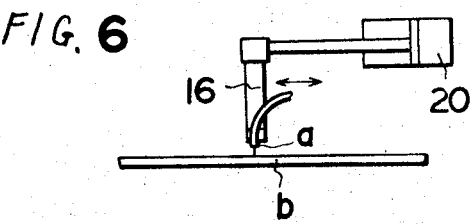
FIG. 6 is a schematic side elevation of a further embodiment of a tack-welding unit and a structure for reciprocating the same.

In the structure shown in FIG. 6, the nozzle holder 16 is carried by a piston rod of a fluid-pressure assembly 20, driven by oil or by air, for example, with the piston being reciprocated to bring about the reciprocating movement of the tack-welding unit.

The several members which constitute an article which is tack-welded may be oriented in suitable positions with respect to each other and maintained in these positions by suitable guide rollers which are not illustrated and which engage these members during actual tack-welding operations.

Thus, as is apparent from the above description and the drawings, with the installation and method of the present invention it is possible to carry out tack-welding while the work moves at an extremely high speed. The tack-welding unit is also moved parallel to the work and the tack-welding operations are carried out in accordance with the differential between the speed of the tack-welding unit and the speed of the work while they both move in the same direction. This speed differential is maintained at a value which is normal for conventional tack-welding operations. Thus, with the invention it is possible to achieve the great advantage of moving the work at a high speed on the order of 6,000 mm/min., or even more, while automatic tack-welding operations are carried out without in any way reducing the speed of movement of the work. Up to the present time it has not been possible to carry out automatic tack-welding operations of work moving at this high speed.

Of course, the spacing between the successive tack welds can be regulated as desired. Thus, if it is desired to locate the successive tack welds closer to each other, then an arrangement can be chosen where the tack-welding unit is moved at a speed greater than that of the work. However, even where the work moves at a speed greater than that of the tack-welding unit it is possible to vary the speed within permissible ranges which will achieve the required spacing between the successive tack welds, and of course the same is true of the reverse arrangement where the tack-welding unit moves at the speed greater than the work. In other words, the recirocating cycles of the nozzle of the tack-welder can be increased or decreased in number while maintaining the tack-welding speed, or in other words, the differential between the work and the tack-welding unit, within a range suitable for satisfactory tack-welding. However, if desired, it is possible to use one or more additional tack-welding units which thus can handle additional work to be distributed with the spacing between the successive tack welds also being capable of regulation in the manner described above. Any time it is desired to increase the spacing between the tack welds it is only necessary to decrease the number of reciprocating cycles of the tack-welding unit.

With a particular embodiment of the invention the tack-welding machine was a fully automatic welding machine capable of utilizing a welding wire of 12 $\phi$, operating at 220 A and at 30 V, and the welding speed was 0.6 – 10 m/min.

What is claimed is:

1. In a tack-welding method, the steps of moving work which is to be tack-welded at a given speed and in a given direction along a given path, simultaneously moving a tack-welding unit for tack-welding the work along a second path parallel to and adjacent said given path at least part of the time in the same direction as the work but at a second speed sufficiently different from the given speed of the work to provide between the work and the tack-welding unit a relative movement at a speed suitable for tack-welding operations, and actuating the tack-welding unit to deposit a tack weld of predetermined length at the work at least during part of the time that the tack-welding unit and work move at said second and given speeds, respectively, in the same direction, and distributing the work tack-welded by said tack-welding unit to a plurality of welding machines for receiving the work tack-welded by said tack-welding unit, said given speed of the work being sufficiently great to provide at any one of said plurality of welding machines a constantly increasing backlog of work incapable of being handled by any one of said plurality of machines while said given speed of the work is adequate to supply the work to said plurality of welding machines at a rate which will maintain the plurality of welding machines in continuous operation.

2. In a method as recited in claim 1 and wherein, the work moves at a speed greater than the tack-welding unit at least while they both move in the same direction.

3. In a method as recited in claim 1 and wherein the work moves at a speed slower than the tack-welding unit at least while they both move in the same direction.

4. In a method as recited in claim 1 and wherein, the tack-welding unit is reciprocated along said second path first in the same direction as the work from a given starting location to a given end location and then in a reverse direction back from said end location to said starting location.

5. In a method as recited in claim 1, the difference between the speed of the tack-welding unit and the work being sufficiently great to provide for the tack-welding unit a tack-welding speed which is between 600 mm/min. and 1,000 mm/min.

6. In a method as recited in claim 5, and wherein the given speed of the work is 6,000 mm/min.

7. In a method as recited in claim 6 and wherein the speed of said unit is 5,400 mm/min., to provide a tack-welding speed of 600 mm/min.

* * * * *